United States Patent
Wang (10) Patent No.: US 8,190,982 B2
(45) Date of Patent: May 29, 2012

(54) ERROR-TOLERANT MULTI-THREADED MEMORY SYSTEMS WITH REDUCED ERROR ACCUMULATION

(75) Inventor: Lei Wang, Holden, MA (US)

(73) Assignee: University of Connecticut, Farmington, CT (US)

(*) Notice: Subject to any disclaimer, the term of this patent is extended or adjusted under 35 U.S.C. 154(b) by 1231 days.

(21) Appl. No.: 11/863,353

(22) Filed: Sep. 28, 2007

(65) Prior Publication Data
US 2008/0082893 A1    Apr. 3, 2008

Related U.S. Application Data

(60) Provisional application No. 60/848,627, filed on Sep. 29, 2006.

(51) Int. Cl.
G11C 11/00 (2006.01)
H03M 13/00 (2006.01)

(52) U.S. Cl. ........................ 714/805; 714/758
(58) Field of Classification Search .................. 714/758, 714/763, 764, 765, 805
See application file for complete search history.

(56) References Cited

U.S. PATENT DOCUMENTS

| | | | |
|---|---|---|---|
| 5,604,702 A | 2/1997 | Tailliet | |
| 5,996,096 A | 11/1999 | Dell et al. | |
| 6,397,290 B1 | 5/2002 | Williams et al. | |
| 6,542,973 B2 | 4/2003 | Hsu et al. | |
| 6,850,093 B1 | 2/2005 | Wang | |
| 7,512,724 B1* | 3/2009 | Dennis et al. | 710/45 |
| 2005/0223199 A1* | 10/2005 | Grochowski et al. | 712/235 |

OTHER PUBLICATIONS

Jang-Ping Sheu; Chih-Yung Chang; , "Extracting multi-thread with data localities for vector computers ," Parallel and Distributed Systems, 1994. International Conference on , vol., No., pp. 466-473, Dec. 19-22, 1994.*
Guangzuo Cui; Mingzeng Hu; Xiaoming Li; , "Parallel replacement mechanism for multithread," Advances in Parallel and Distributed Computing, 1997. Proceedings , vol., No., pp. 338-344, Mar. 19-21, 1997.*
Arul, J.M.; Tsozen Yeh; Chiacheng Hsu; Janjr Li; , "An efficient way of passing of data in a multithreaded scheduled dataflow architecture," High-Performance Computing in Asia-Pacific Region, 2005. Proceedings. Eighth International Conference on , vol., No., pp. 6 pp. -492, 1-1 Jul. 2005.*
Yeager, The MIPS R10000 Superscalar Microprocessor, IEEE Micro, pp. 28-40, 1996.
Tullsen, Simulation and Modeling of A Simultaneous Multithreading Processor, Proc. 22nd Annual Computer Measurement Group Conference, Dec. 1996.
SPEC CPU2000 Benchmark Descriptions, CINT2000 (Integer Component of SPEC CPU2000); http://www.spec.org/cpu2000/CINT2000/index.html.

(Continued)

Primary Examiner — Cynthia Britt
(74) Attorney, Agent, or Firm — McCarter & English, LLP (57) ABSTRACT

Systems and methods establishing and/or utilizing an error-tolerant multithreaded register file are provided. The systems and methods employ dynamic multithreading redundancy (DMR) for error correction. Non-overlapped register access patterns associated create hardware redundancy dynamically that is exploited for error control. Immediate write-back and self-recovery techniques are employed to further enhance the error correction functionalities of the disclosed systems and methods. Error control is improved for memory components and processing functions in multithreaded computing systems.

9 Claims, 5 Drawing Sheets

OTHER PUBLICATIONS

SPEC CPU2000 Benchmark Descriptions, CINT2000 (Floating Point Component of SPEC CPU2000); http://www.spec.org/cpu2000/CINT2000/index.html.

Dodd et al., Basic Mechanisms and Modeling of Single-Event Upset in Digital Microelectronics, IEEE Transactions Nuclear Science, vol. 50, pp. 583-602, Jun. 2003.

Fetzer, et al., The Multi-Threaded Parity Protected 128 Word Register Files on A Dual-Core Itanium Architecture Processor, Proc. International Solid-State Circuits Conference (ISSCC), pp. 382-383, Feb. 2005.

Baumann, Soft Errors in Advanced Computer Systems, IEEE Design & Test of Computers, vol. 22, pp. 258-266, May-Jun. 2005.

Wang, Error-Tolerance Memory Microarchitecture Via Dynamic Multithreading Redundancy, IEEE International Conference on Computer Design, pp. 179-184, Oct. 2-5, 2005.

Wang et al., Reducing Error Accumulation Effect in Multithreaded Memory Systems, IEEE International Symposium on Curcuits and Systems, pp. 1275-1278, May 21-24, 2006.

* cited by examiner

ERROR-TOLERANT MULTI-THREADED MEMORY SYSTEMS WITH REDUCED ERROR ACCUMULATION

CROSS-REFERENCE TO RELATED APPLICATION

The present application claims the benefit of a co-pending commonly assigned provisional patent application entitled "Error-Tolerant Multithreaded Memory Systems" which was filed on Sep. 29, 2006 and assigned Ser. No. 60/848,627. The entire content of the foregoing provisional patent application is incorporated herein by reference.

BACKGROUND

1. Technical Field

The present disclosure is directed to systems and methods establishing/utilizing an error-tolerant multithreaded register file that employs dynamic multithreading redundancy (DMR) for error correction. More particularly, non-overlapped register access patterns associated with the disclosed systems and methods create hardware redundancy dynamically that is exploited for error control. Thus, the present disclosure relates generally to memory structures in computers and, more particularly, to error control related to memory components and functions in multithreaded computing systems.

2. Background Art

Research in computer architecture has focused on exploiting higher levels of parallelism in instruction processing. Chip multithreaded computing, such as simultaneous multithreading (SMT) and chip multiprocessors (CMP), generally allows effective resource utilization and thus has potential to achieve higher levels of instruction throughput. Indeed, SMT and/or CMP based architectures have the potential of long-term scalability.

Figure 1:
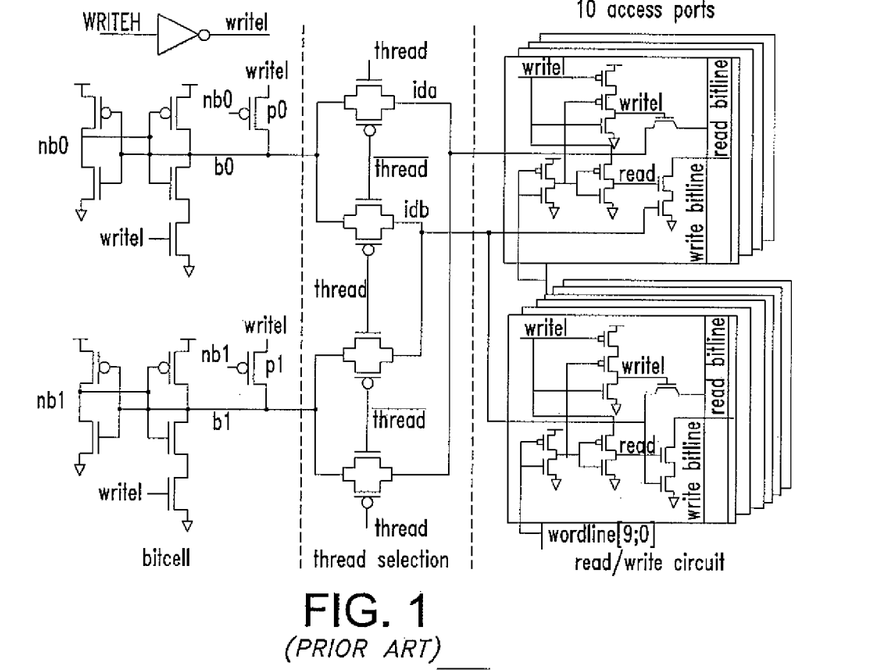
FIG. 1 (prior art) is a schematic illustration of a known dual-threaded register file bitcell.

In multithreaded memory systems, each physical address is mapped to multiple sets of adjacent memory cells for access by concurrent threads. FIG. 1 illustrates a conventional bitcell in a dual-threaded register. To support dual-threaded execution, each register bitcell integrates two identical memory cells. Four transmission gates determine the thread selection, where each memory cell is exclusively accessible by one thread. A thread switch is performed by flipping the control signal thread.

The dual-threaded register files essentially doubles the number of memory cells and thus the physical size of the data array. However, chip multithreaded computing raises a set of new challenges. For example, new memory components, such as multithreaded register files, become critical to computing effectiveness and reliability. As the size of register files continues to increase to facilitate multithreaded computing, register files become vulnerable to transient (soft) errors caused by particle strikes. Soft errors occur randomly and cause no permanent damage and, hence, are tough to detect, track and/or control. These unpredictable errors raise a serious concern with respect to register file reliability. Register files are performance-critical and directly impact the integrity and efficiency of instruction execution.

A known technique aimed at addressing the potential for transient (soft) errors involves embedding a low-complexity parity checking logic into each register entry to provide simple but effective error detection. [See E. S. Fetzer, L. Wang and J. Jones, "The multi-threaded parity protected 128 word register files on a dual-core Itanium Architecture Processor," *Proc. International Solid-State Circuits Conference* (*ISSCC*), pp. 382-383, February 2005.] The parity checking logic computes the parity bit of each register entry. A parity upset caused by soft errors is detected and reported with a read operation. The parity checking logic remains active and computes the parity bit continually. A content change due to write operation or thread switch triggers parity checking logic to recompute the parity bit. Due to the requirement of single cycle latency, run-time error correction is hard to achieve. If a parity error is reported, the pipeline is flushed and a cache access may be initiated to retrieve the correct data, thereby negatively impacting system performance.

Figure 2:
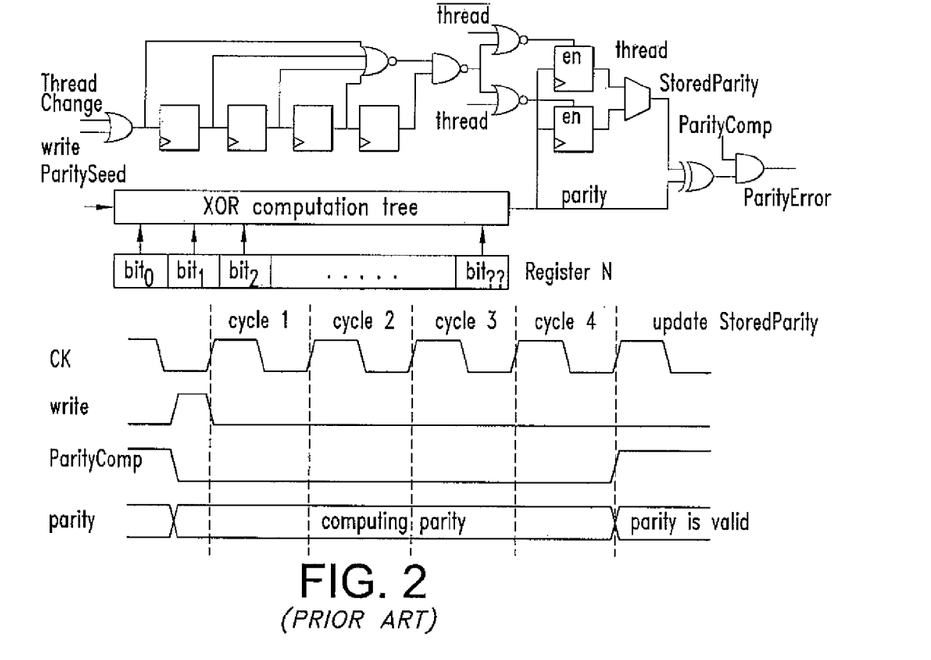
FIG. 2 (prior art) is a schematic illustration of a known embedded parity checking logic scheme.

More particularly and with reference to FIG. 2, a high speed XOR tree performs parity computation on the stored register data. The final parity and parity valid bits are delivered to latches for parity comparison. Parity computation takes a few clock cycles to complete (four for floating point register file; three for integer register file). A write operation or a thread switch event triggers control logic to clear the ParityComp signal and starts the parity computation. The StoredParity signal is updated after four (or three) clock cycles when the new parity becomes valid. Thus, frequently written registers receive less parity protection due to the latency in computing parity. However, these registers get updated frequently and thus are less susceptible to soft errors. The XOR tree remains active and computes the parity signal on a constant basis. A parity upset caused by soft errors will set the ParityError bit, which is available along with the register data by read operations. If a parity error is reported, the pipeline is flushed and a cache access may be initiated to retrieve correct data.

Existing error-control solutions also include radiation-hardened memory structures, double or triple memory redundancy, and code checking logic. These solutions have shown to be effective for caches and DRAM chips, where design overheads are manageable because of the long access latency and out-of-path error correction. However, integrating existing error-control techniques into register files presents a significant challenge due to the severe constraints on area and timing margins. Building and integrating full-fledged error-control schemes in register files is practically impossible because, inter alia, such schemes will hurt performance.

Thus, despite efforts to date, a need remains for systems/methods that provide efficient error-control to ensure robust operation for multithreaded register files. In addition, a need remains for systems/methods that reduce the potential for error accumulation effects in multithread memory systems. These and other needs are satisfied and/or addressed by the systems and methods disclosed herein.

SUMMARY

The present disclosure provides advantageous systems and methods that include an error-tolerant multithreaded register file that employs dynamic multithreading redundancy (DMR) for error correction. The error correction modalities disclosed herein capitalize on the fact that concurrent threads may not (and generally do not) access a register entry simultaneously. The non-overlapped register access patterns create inherent hardware redundancy that can be accessed/leveraged dynamically in a manner that can address and/or obviate potential register file-based errors, including particularly potential "soft errors" that may arise in register files.

The present disclosure further provides advantageous systems and methods that reduce the potential for an error accumulation effect, i.e., the accumulated effect due to multiple transient errors occurring over time, in multithreaded memory systems through immediate write-back and self-recovery techniques. Based on simulation results, the disclosed immediate write-back and self-recovery techniques are effective in improving error-control performance with minimal hardware overhead. As described herein, the disclosed systems and methods, i.e., dynamic multithreaded redundancy (DMR) and immediate write-back/self-recovery, may be effectively scaled to accommodate future processing needs and/or processing generations.

The systems and methods of the present disclosure are particularly useful for chip multithreaded computing. Multithreaded architectures integrate sets of identical hardware resources to support execution of concurrent threads. This creates an opportunity for DMR by exploring inherent redundancy in hardware utilization created by inter-thread variations. DMR allows system resources to cooperate effectively for various error-control tasks.

In an exemplary embodiment of the present disclosure, systems and methods are provided that employ dynamic multithreading redundancy, whereby threads generally do not access a register entry simultaneously. The non-overlapped register access patterns create hardware redundancy dynamically that are exploited for error control according to the present disclosure. For example, in dual-threaded register files, each register entry contains two sets of memory cells accessible by different threads. The set of memory cells released by the inactive thread may be advantageously treated as redundant hardware, and thus can be utilized to store a copy of active thread. Since the two sets of memory cells are physically adjacent and can be accessed by the same address, the access latency can be maintained within the read timing budget, thereby facilitating efficient error control.

Exemplary systems and methods of the present disclosure also feature several improvements over conventional error-related approaches. For example, the disclosed systems and method facilitate real-time error correction. Conventional error-related techniques cannot achieve real-time error correction for register files. By way of example, according to the present disclosure, if a soft error is detected in the active thread and a redundant copy is available, the active thread can fetch the redundant copy instead of initiating a time-consuming error correction process. This technique leads to substantial performance gain in error-control. In addition, this technique yields a cost reduction with respect to error correction. If an error is detected, the redundant copy, if available, can be accessed (retrieved) locally and potential access latency can be maintained within the desired performance parameters. Therefore, performance and energy costs related to the pipeline flush and/or cache accesses can be avoided.

Additional features, functions and benefits of the present disclosure will be apparent from the description of exemplary embodiments and implementations presented herein, particularly when read in conjunction with the accompanying figures.

BRIEF DESCRIPTION OF THE FIGURES

To assist those of skill in the art in making and using the disclosed systems and methods, reference is made to the accompanying figures, wherein.

DESCRIPTION OF EXEMPLARY EMBODIMENT(S)

Exemplary systems and methods of the present disclosure provide error-tolerant multithreaded register file(s) that employ dynamic multithreading redundancy (DMR) for error correction. Exemplary systems and methods of the present disclosure also reduce the potential for an error accumulation effect, i.e., the accumulated effect due to multiple transient errors occurring over time, in multithreaded memory systems through immediate write-back and self-recovery techniques. Preferred embodiments and implementations of the present disclosure employ both DMR for error correction and immediate write-back/self-recovery techniques to reduce the potential for error accumulation. However, the present disclosure is not limited to embodiments and/or implementations wherein both advantageous functionalities are employed and/or provided. Rather, exemplary embodiments of the present disclosure may provide the disclosed DMR/error correction functionality or the disclosed immediate write-back/self-recovery technology, as may be desired in particular applications.

With initial reference to the disclosed implementation of DMR for error correction, it is noted that concurrent threads may not (and generally do not) access a register entry simultaneously. As a result, the non-overlapped register access patterns offer inherent hardware redundancy. Such inherent redundancy may be used to overcome potential register file-based errors, including particularly potential "soft errors" that may arise in register files.

Figure 3:
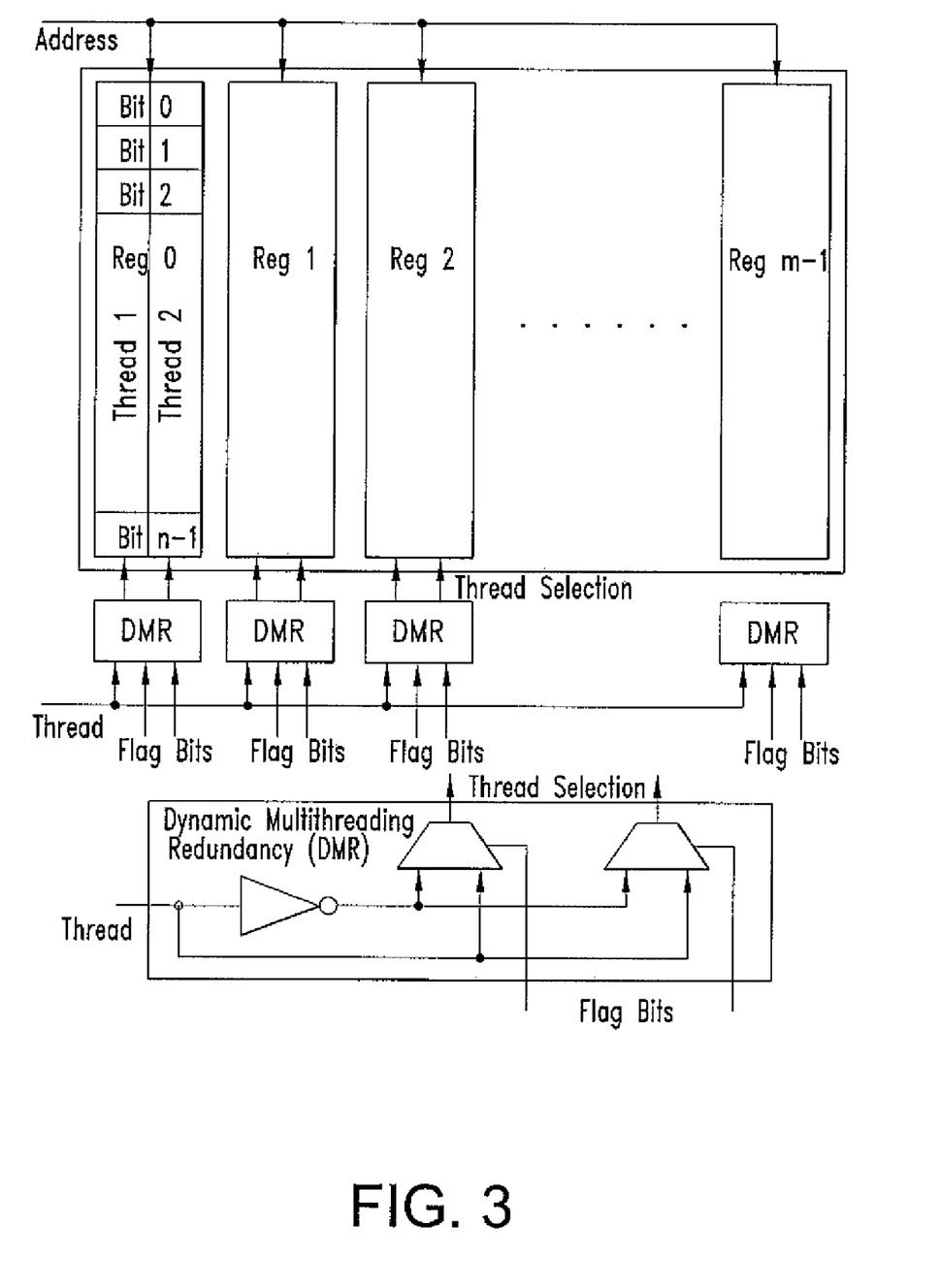
FIG. 3 is a schematic illustration of an exemplary DMR-based microarchitecture according to the present disclosure.

Thus, with reference to FIG. 3, an exemplary register file microarchitecture is provided for implementation of the disclosed dynamic multithreading redundancy (DMR) for error control. Two sets of memory cells in each register entry are assigned to two different threads. Two flag bits are introduced, one for each set of memory cells, to track the status of memory usage. These flag bits provide information on memory status. A flag bit is set when the execution unit/thread is done with the data in the memory (register) and the memory is available for reuse. A write request by one thread will first check the flag bit of the other thread. If the flag bit is set, both sets of memory cells will be updated with the new data, one of which is a redundant copy for the purpose of error protection.

In exemplary embodiments of the present disclosure, embedded parity checking logic monitors the active thread continually. If a parity error due to soft errors or other failures is detected, the noted redundant copy will be used for subsequent register accesses. In such circumstances, the redundant copy is statistically error-free because the possibility that both copies are corrupted at the same time is several orders of magnitude smaller than single event upsets (SEU). [See, P. E. Dodd and L. W. Massengill, "Basic mechanisms and modeling of single-event upset in digital microelectronics," *IEEE Transactions Nuclear Science*, Vol. 50, pp. 583-602, June 2003.] The redundant copy can also be utilized to update the corrupted memory set for the active thread to prevent potential error accumulation effects.

The disclosed flag bits can be generated by monitoring memory behaviors using various microarchitecture schedulers. Many commercially available microprocessors support a register renaming function to overcome artificial dependence in ordering constraint. [See K. Yeager, "The MIPS R10000 superscalar microprocessor," *IEEE Micro*, pp. 28-40, 1996.] Register renaming functionality generally maintains a register renaming table and a free register list. The free register list contains the names of physical registers that are currently available for reuse. These free registers can be utilized according to the present disclosure to provide dynamic multithreading redundancy. Thus, the flag bits can be configured during runtime according to the free register list generated by the register renaming logic. To prevent soft errors in the flag bits, radiation-hardened memory structures may be utilized. The induced overheads are manageable/acceptable because the flag bits only account for a small amount of transistor budget in memory data arrays.

The disclosed noise-tolerance microarchitecture advantageously introduces very small overheads. More particularly, in exemplary embodiments/implementations of the disclosed DMR for error control, the incremental hardware overhead generally involves two additional memory cells per register to store the two flag bits. Also, control logic is utilized to establish the link between the flag bits and the register renaming logic. Such linkage may be established by buffering the content of the register renaming table directly to the flag bits. The disclosed error-tolerance microarchitecture provides an efficient and effective solution to overcome soft error degradation. Indeed, simulation results demonstrate 28.9% performance improvement on average read access latency with about 2% hardware overheads.

For performance analysis purposes, a statistical analysis may be used to quantify the performance of the disclosed error-tolerance memory microarchitecture. A parity checking logic was embedded in conventional multithreaded register files to detect soft errors. Parity calculation and comparison may be performed in parallel with register access without interfering access timing. However, runtime error correction is not feasible due to the single-cycle latency timing constraint.

More particularly, an m-word by n-bit register file may be considered, wherein each register bit is comprised of p memory cells to facilitate p-threaded simultaneous execution. Additionally, it may be assumed that the register file integrates k read ports, thereby implying that k register entries can be read out simultaneously.

The soft error rate (SER) may be denoted as $\beta_s$. Considering the dominant effect due to single event upsets (SEUs), the failure rate of a memory cell due to soft errors is thus equal to $\beta_s$. Consequently, the probability that a parity error will be detected in an n-bit register entry is equal to $p_e$, which is given by $$p_e = \beta_s(1-\beta_s)^{n-1} \quad (1)$$

In practice, the value of $p_e$ should also account for the effect of multiple errors. However, this effect is negligible because its probability is several orders of magnitude smaller than SEU.

If $p_i$ represents the probability that i register entries will be read simultaneously (where i=1, 2 ... k), if a parity error is reported in any of these entries, the corresponding read-out data is discarded and a new copy is recomputed. A performance overhead is necessarily anticipated due to the extra cache assesses. The probability $p_c$ of extra cache accesses is given by:

$$p_c = \sum_{i=1}^{k} p_i p_e (1-p_e)^{i-1} \quad (2)$$

where $p_c$ is given by equation (1) above. Thus, the average overheads associated with read access $T_r^s$ due to correcting soft errors can be expressed as:

$$T_r^s = p_c T_c \quad (3)$$

where $T_c$ is the latency of cache assess.

As noted above, the disclosed error-tolerance microarchitecture employs dynamic multithreading redundancy (DMR) to store a local copy of an active thread. If a parity error is detected in the register/memory location corresponding to the active thread, the local copy is statistically error-free and is recalled by the disclosed systems/methods, rather than requiring pipeline flush and/or communication with L1 caches to acquire the requisite information/data. As parity errors can be detected during runtime and the local copy can be read out within the read timing budget, the disclosed error-tolerance memory microarchitecture does not introduce speed overheads if the set of memory cells for the inactive thread is free to use. If not, a cache access may be initiated to retrieve data from L1 caches. As a result, the average overheads of read access $T_r^{dmr}$ of the proposed microarchitecture can be expressed as $$T_r^{dmr} = p_c(p_d T_r + (1-p_d)T_c) \quad (4)$$

where $T_r$ is the latency of register read access and $p_d$ is the probability that the dynamic multithreading redundancy is available when a soft error is encountered. In general, $T_c > T_r$ and $p_d \gg p_e$. Thus, $T_r^{dmr}$ will be much smaller than $T_r^s$.

For purposes of evaluating performance, a simulation environment was built to emulate a generic dual-threaded processor. The processor included a 16 kb L1 data cache and a 16 kb L1 instruction cache, both modeled with an access time of two clock cycles. The register file was designed with single-cycle latency, supporting back-to-back read and write operation with access time equal to half of the clock cycle. The register file was dual-threaded with 128 word×64 bit and 12 read ports. A pair of flag bits was introduced for each register entry to monitor dynamic multithreading redundancy for error control. This effectively increased the register width to 65 bits, which is approximately equivalent to 2% hardware overheads.

An SMT architecture simulator was built with an extension to support error tolerance via dynamic multithreading redundancy based on the SMTSIM simulator. [See D. M. Tullsen, "Simulation and modeling of a simultaneous multithreading processor," *Proc. 22nd Annual Computer Measurement Group Conference*, December, 1996.] Tests were performed on twelve job pairs randomly selected from the twelve SPEC CPU2000 benchmarks. [See SPEC CPU2000 benchmark suite, http://www.spec.org/cpu2000/]. A register renaming logic was utilized to update the flag bits during runtime. [See K. Yeager, "The MIPS R10000 superscalar microprocessor," *IEEE Micro*, pp. 28-40, 1996.]

Table 1 shows the reduction of register read access overheads (defined as $$\left(1 - \frac{T_r^{dmr}}{T_r^s}\right)$$

achieved by the disclosed error-tolerance microarchitecture. In these simulations, SER=$10^{-6}$ (a.u.) was selected for purposes of illustration. With reference to the data set forth in Table 1, performance improvement ranged from 13.8% to 50.7%, with an average performance improvement of 28.9%.

TABLE 1

Performance of disclosed error-tolerance memory architecture with SER = $10^{-6}$ (a.u.).

| Job Pair Number | SPEC CPU200 Benchmark | Reduction of Access Overheads |
|---|---|---|
| 1 | 300.twolf, 253.perlbmk | 36.4% |
| 2 | 197.parser, 255.vortex | 27.1% |
| 3 | 256.bzip2, 175.vpr | 26.6% |
| 4 | 252.eon, 254.gap | 47.5% |
| 5 | 176.gcc, 186.crafty | 50.7% |
| 6 | 164.gzip, 181.mcf | 13.8% |
| 7 | 255.vortex, 186.crafty | 21.1% |
| 8 | 176.gcc, 253.perlbmk | 30.3% |
| 9 | 252.eon, 300.twolf | 17.3% |
| 10 | 186.crafty, 181.mcf | 18.5% |
| 11 | 175.vpr, 197.parser | 42.5% |
| 12 | 164.gzip, 256.bzip2 | 15.2% |

This simulation data confirms anticipated benefits associated with the disclosed microarchitecture eliminates many extra cache accesses by employing dynamic multithreading redundancy for error control.

Table 2 shows the same set of simulations for SER=$10^{-4}$ (a.u.). This value represents projected scenarios for future >4 Gbs DRAMs in sub-100 nm process nodes. Based on the data set forth in Tables 1 and 2, the disclosed error-tolerance microarchitecture advantageously maintains the same level of reduction in register read access overheads despite the worsening soft error scenario to be encountered in future processing environments. This consistency in performance is primarily due to the fact that the probability of available dynamic multithreading redundancy $p_d$ in equation (4)) is typically much larger than SER. Thus, the chance that a soft error can be corrected promptly by the disclosed dynamic multithreading redundancy technique is statistically unchanged as SER increases. As a result, it is clear that the disclosed error-tolerance microarchitecture features good scalability for future microprocessor generations, where soft error degradation is expected to get worse with semiconductor process scaling.

In practice, the SER is determined by a complex interplay among semiconduction process, memory structure, logic and circuit topology, and environment. Many methods exist to determine the SER for various circuits. For purposes of performance evaluation herein, SER values for register files were not computed; rather, performance was evaluated for different SER values. Based on the performance results reported herein, the performance improvement does not depend on any specific value of SER but is achieved independent thereof.

TABLE 2

Performance of disclosed error-tolerance memory architecture with SER = $10^{-4}$ (a.u.)

| Job Pair Number | SPEC CPU200 Benchmark | Reduction of Access Overheads |
|---|---|---|
| 1 | 300.twolf, 253.perlbmk | 36.2% |
| 2 | 197.parser, 255.vortex | 26.8% |
| 3 | 256.bzip2, 175.vpr | 25.8% |
| 4 | 252.eon, 254.gap | 47.4% |
| 5 | 176.gcc, 186.crafty | 59.9% |
| 6 | 164.gzip, 181.mcf | 13.4% |
| 7 | 255.vortex, 186.crafty | 20.7% |
| 8 | 176.gcc, 253.perlbmk | 29.8% |
| 9 | 252.eon, 300.twolf | 16.6% |
| 10 | 186.crafty, 181.mcf | 18.4% |
| 11 | 175.vpr, 197.parser | 42.2% |
| 12 | 164.gzip, 256.bzip2 | 15.0% |

Thus, systems and methods of the present disclosure advantageously employ an error-tolerance multithreaded register file microarchitecture that leverages dynamic multithreading redundancy for error control. The disclosed error-tolerance memory microarchitecture demonstrates enhanced performance (based on simulation-based evaluations) and offers scalability for future microprocessor generations, where soft error degradation is expected to get worse with semiconductor process scaling.

Turning to a second aspect of the present disclosure, it is noted that memory systems are particularly prone to error accumulation over time. Error accumulation refers to the accumulated effect due to multiple transient errors occurring over time. A memory entry is unlikely to be written at every cycle. Data stored in a given memory entry is thus vulnerable to multiple errors during the idle period. Error accumulation may result in failures in error-control schemes to detect and correct data corruptions.

As an example, for an n-bit register R embedded with a parity checking logic, the parity bit P(n) at time instant n may be generated by a bitwise XOR computation, i.e., $$P(n) = R_0(n) \otimes R_1(n) \otimes \ldots R_{N-2}(n) \otimes R_{N-1}(n) \quad (5)$$

where $R_k(n)$ [k=0, 1 ... N−1] is the $k^{th}$ bit of the register R at time n, and ⊗denotes the bitwise XOR operator. Assuming that an SEU flips the bit $R_i$ at time $n_1$, i.e., $R_i(n_1)=\overline{Ri(n)}$. From equation (5), $P(n_1)=\overline{P(n)}$, which indicates a parity error. This parity error will initiate data correction action(s) only if the register R receives a read request. This is because error correction is relatively expensive and thus it is not necessary to correct the corrupted data if the data is not in use.

Failure to correct such errors, however, creates a potential problem of error accumulation. It is possible that another SEU corrupts a different bit of register R, e.g., $R_j$, at a later time $n_2$. As parity checking logic remains active, multiple errors on register R may result in a cancellation of parity error, i.e., $P(n_2)=\overline{P(n_1)}=P(n)$. Thus, error accumulation potentially hides parity errors from being detected. If this happens, the subsequent read will obtain corrupted data which may lead to system-critical failures. Error accumulation is considered as a potential source of reliability degradation in various environments, e.g., nanoscale memory systems.

Figure 4A:
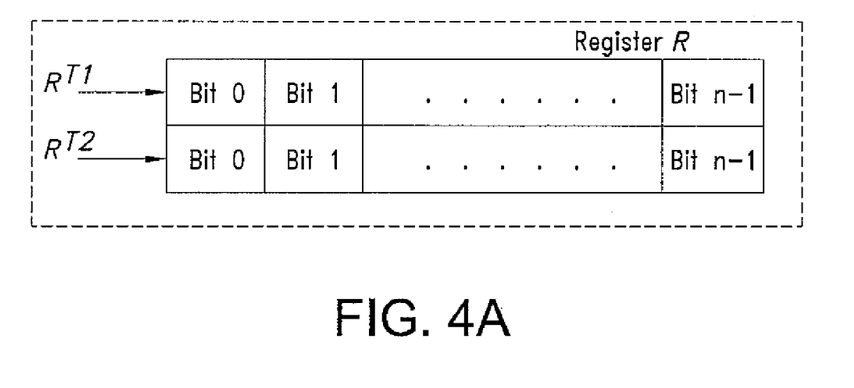
FIGS. 4(a), 4(b) and 4(c) provide schematic illustrations of error-tolerance techniques according to exemplary embodiments of the present disclosure.

According to exemplary systems and methods of the present disclosure, an immediate write-back scheme may be introduced to reduce the potential for accumulation error. In a standard DMR, the memory set associated with an inactive thread is not utilized for redundancy until the active thread initiates a write operation. Thus, with reference to FIG. 4(a), a register R incorporates two sets of identical memory, $R^{T1}$ and $R^{T2}$, for access by two concurrent threads T1 and T2, respectively. If thread T1 releases the memory $R^{T1}$ at time $n_1$, and thread T2 initiates a write operation later at time $n_2$ (see FIG. 4(b)), then at time $n_2$, thread T1 is inactive for a period and $R^{T1}$ is free for reuse. Employing DMR, both $R^{T1}$ and $R^{T2}$ may be written by thread T2 at time $n_2$, where $R^{T1}$ serves as a redundant copy for error control.

Figure 4B:
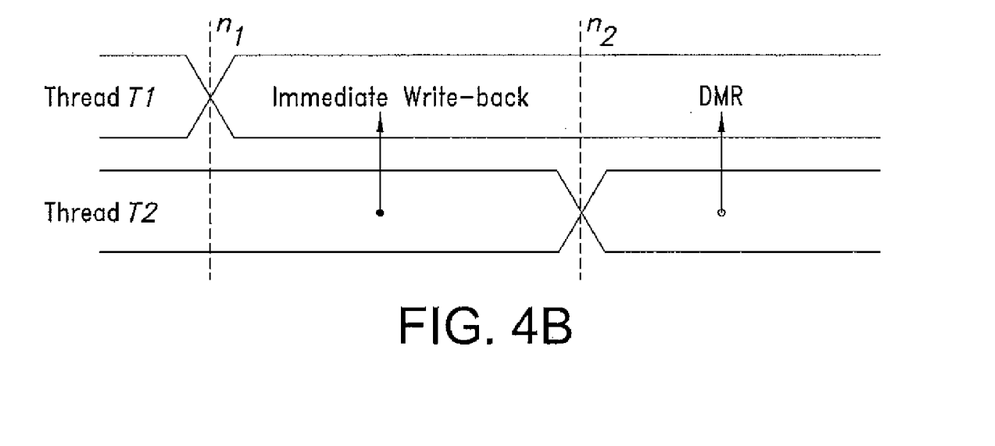

Of note, $R^{T1}$ can be utilized earlier for this redundancy purpose, e.g., right after it is set free at time $n_1$. In this way, immediate write-back scheme(s) may be employed according to the present disclosure, whereby error control is extended to time period between $n_1$ and $n_2$. The immediate write-back generates a replica of $R^{T2}$ in $R^{T1}$ as soon as $R^{T1}$ is released by T1. After the write-back operation is completed, both $R^{T1}$ and $R^{T2}$ are assigned to T2 for subsequent write operations for as long as T1 remains inactive. The immediate write-back functionality associated with the disclosed systems and methods improves error tolerance by providing extended coverage to multithreaded memory systems.

A further DMR enhancement implemented according to exemplary embodiments of the present disclosure involves a self-recovery technique. The disclosed self-recovery technique, when implemented in combination with immediate write-back functionality as described herein, effectively addresses potential error accumulation issues. Thus, with reference to FIG. 4(c), memory operations after time $n_2$ are shown. Both $R^{T1}$ and $R^{T2}$ store the same set of data, where $R^{T2}$ is currently used by the active thread T2, and $R^{T1}$ is a redundant copy for error control. A parity checking logic remains active and computes the parity bit of the active thread continually. Thus, a parity error will be detected immediately, but in current/conventional systems, error correction is postponed until a read request is sent to $R^{T2}$, thereby exposing the memory to possible error accumulation while waiting for read operations.

Figure 4C:
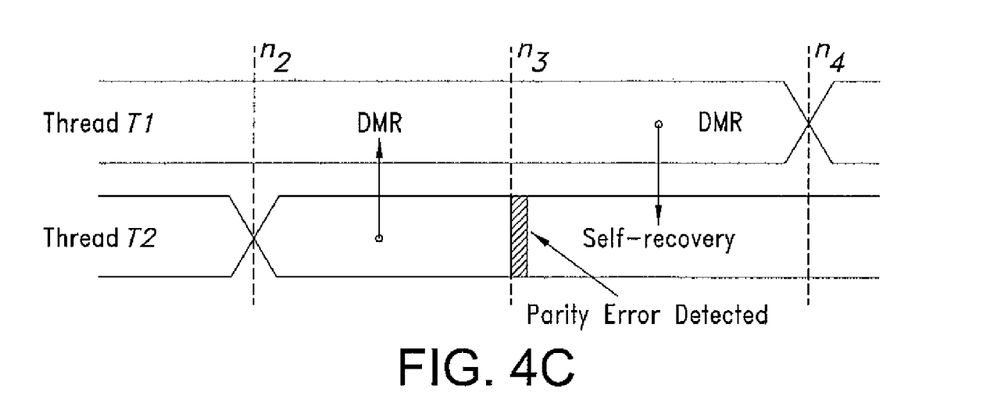

However, according to the present disclosure, self-recovery advantageously functions to promptly correct $R^{T2}$ using the redundant copy in $R^{T1}$ as soon as a parity error in $R^{T2}$ is detected. Self-recovery is performed only in the corrupted memory entry without affecting concurrent operations at other memory entries. In most situations, self-recovery allows real-time error correction without involving cache access. Indeed, the redundant copy is statistically error-free because it has no read or write activities and the error probability is several orders of magnitude smaller than that of the active thread.

Figure 5:
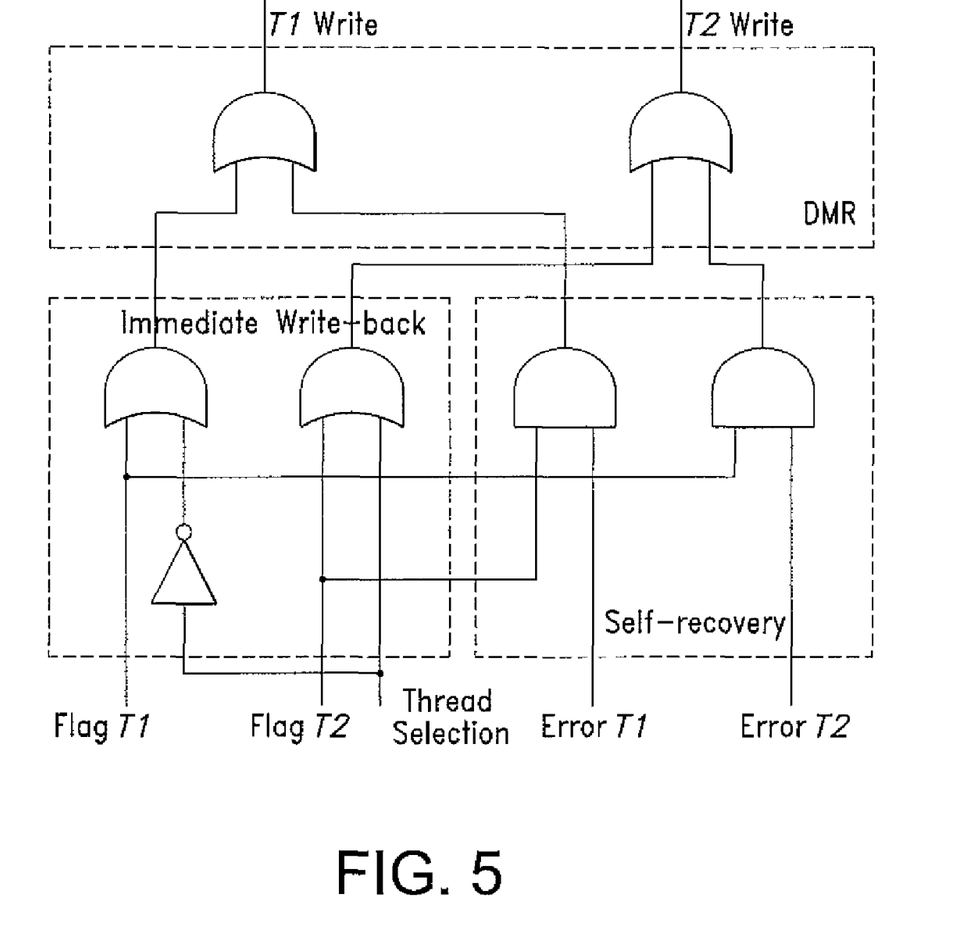
FIG. 5 is a schematic depiction of an exemplary immediate write-back and self-recovery system according to the present disclosure.

FIG. 5 illustrates exemplary control logic for the disclosed immediate write-back and self-recovery techniques. The exemplary control logic generates a Write signal which allows a thread to get a redundant copy of desired data from the other thread. The immediate write-back is achieved by gating the thread selection signal with two flag bits generated by the register renaming logic. A flag bit is set if the corresponding register is finished and the assigned memory set is free. Thus, the active thread can immediately save a redundant copy in the inactive thread for error control. Similarly, the self-recovery technique is achieved by monitoring the parity errors generated by the parity checking logic of the active thread. If a parity error is detected and the corresponding inactive thread stores a redundant copy (i.e., the flag bit is set), the redundant copy will be utilized immediately to correct the active thread. As demonstrated herein, the disclosed error-control techniques are easy to implement with very small overheads.

The disclosed immediate write-back and self-recovery techniques may be used in combination with DMR to provide error accumulation protection for multithreaded memory systems. The immediate write-back and self-recovery techniques disclosed herein do not introduce extra read latency relative to the previously disclosed DMR for soft error protection, the immediate write-back/self-recovery techniques will advantageously maintain the same level of overhead reduction in read access.

For performance evaluation purposes, the same simulation environment as was used in evaluating error accumulation hereinabove is employed. More particularly, a dual-threaded register file featuring 128 word×64 bit, 8 write ports, 12 read ports and supporting single-cycle latency was employed. It is assumed that register read and write operations will introduce errors with a certain probability based on the fact that memory circuits are especially prone to errors during read and write operations. These operations involve substantial contention that is particularly sensitive to soft errors and variations in process parameters, supply voltages and temperature. Since a register entry might be read several times after a write, subsequent read operations potentially introduce multiple errors over time.

Figure 6A:
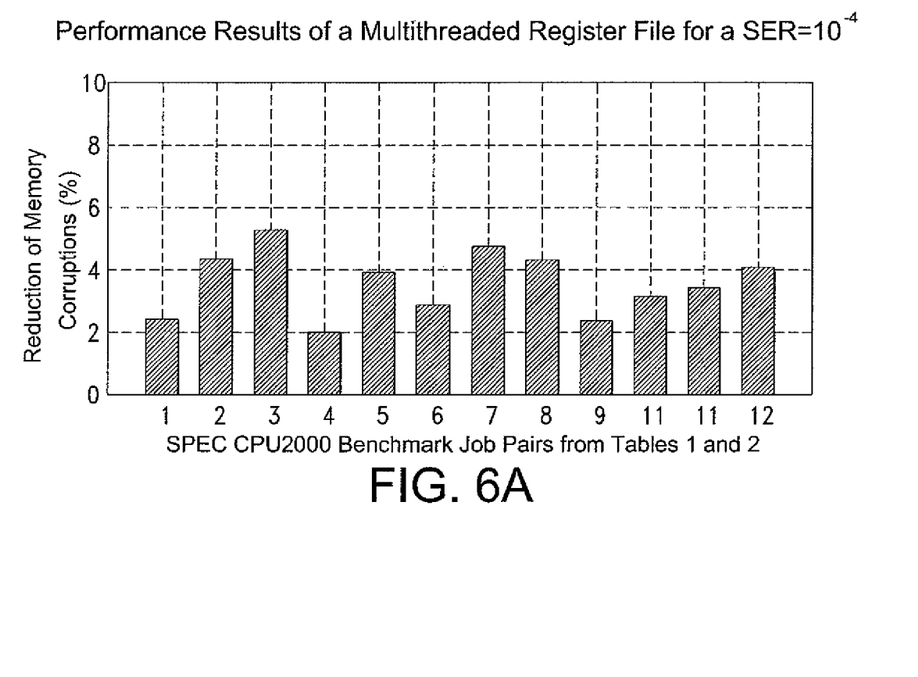
FIGS. 6(a) and 6(b) show exemplary performance results for a multithreaded register file on twelve (12) job pairs randomly selected from the SPEC CPU2000 benchmarks for $SER=10^{-4}$ and $SER=10^{-3}$, respectively.
Figure 6B:
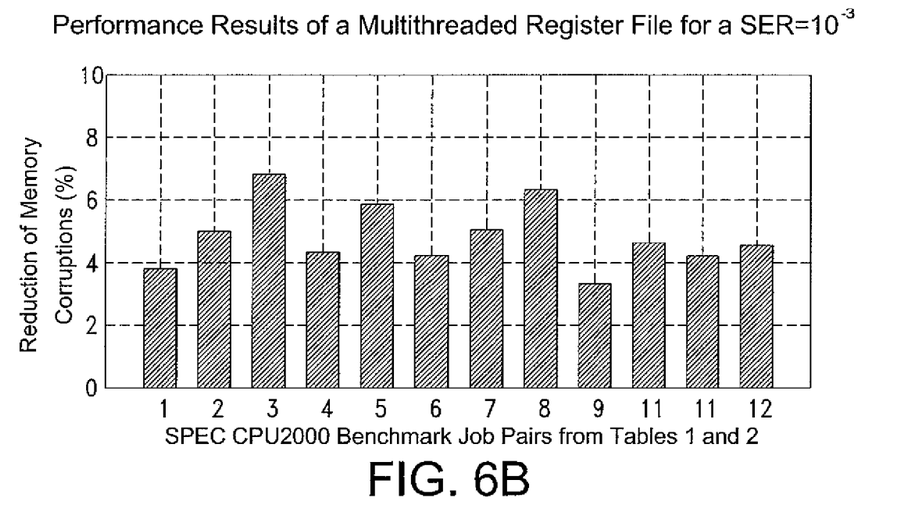

FIGS. 6(a) and 6(b) show the reduction of memory corruptions achieved by an exemplary combination of immediate write-back, self-recovery and DMR as compared to using DMR alone. Initially, the error rate induced by the write and read operations is selected to be $10^{-4}$. This value represents a projected scenario of soft-error rate (SER) in sub-100 nm process nodes. [See R. Baumann, "Soft errors in advanced computer systems," *IEEE Design & Test of Computers*, Vol. 22, pp. 258-266, May-June 2005.]. From FIG. 6(a), the reduction in error rate is measured between 2.1% to 5.4%. Of note, this advantageous reduction in error rate is achieved on top of the superior results achieved through implementation of the disclosed DMR system/method, which already accounts for nearly all of the dominant SEU. The performance improvement obtained by the immediate write-back and self-recovery techniques disclosed herein comes primarily from the reduction of error accumulation.

In the second simulation disclosed herein, the error rate is increased to $10^{-3}$ to emulate a more challenging scenario consistent with future nanoscale integration. Results shown in FIG. 6(b) demonstrate a 3.4% to 6.9% improvement in error reduction. This improved performance is due to the fact that using DMR alone may be inadequate to handle potential increasing error accumulation effects. As a result, the disclosed immediate write-back and self-recovery techniques provide enhanced scalability, e.g., for future processor generations where soft error degradation is expected to become more pronounced with semiconductor process scaling.

Thus, as disclosed herein, immediate write-back and self-recovery enhance DMR by providing effective solutions to reduce error accumulation in multithreaded memory systems. Based on simulation results, the disclosed immediate write-back and self-recovery techniques are effective in improving error-control performance with minimal hardware overhead. As described herein, the disclosed systems and methods, i.e., dynamic multithreaded redundancy (DMR) and immediate write-back/self-recovery, may be effectively scaled to accommodate future processing needs and/or processing generations.

The systems and methods of the present disclosure are particularly useful for chip multithreaded computing. Multithreaded architectures integrate sets of identical hardware resources to support execution of concurrent threads. This creates an opportunity for DMR by exploring inherent redundancy in hardware utilization created by inter-thread variations. DMR allows system resources to cooperate effectively for various error-control tasks.

For purposes of the present disclosure, the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the metal(s) includes one or more metals). Ranges disclosed herein are inclusive and independently combinable.

As used herein the term "error correction" includes one or more of error detection, error-responsive signaling, error correction, elimination of the negative impact of an error on the performance or reliability of a computing step, or minimizing the negative impact of an error on the performance or reliability of a computing step.

While the present disclosure has been described with reference to exemplary embodiments, it will be understood by those skilled in the art that various changes may be made and equivalents may be substituted for the elements thereof without departing from the scope hereof. In addition, many modifications may be made to adapt the teaching of the invention to a particular method, use, application or desired composition without departing from the essential scope thereof. Therefore, it is intended that the invention not be limited to the particular embodiments and best mode contemplated for carrying out this invention as described herein.

The invention claimed is:

1. A multithreading processing system, comprising:
   at least two multithreaded register files, wherein each of the at least two multithreaded register files includes memory cells accessible by different threads;
   means for establishing a flag bit with respect to the memory cells of each of the at least two multithreaded register files, the flag bit being established if a memory cell is free for reuse;
   means for determining the status of the flag bit for a second of the at least two multithreaded register files when receiving a request to write to a first of the least two multithreaded register files, said means for status determination acting to write to both the first and second of the at least two multithreaded register files if the flag bit is established for the second multithreaded register file, thereby establishing a redundant data entry on the first and second multithreaded register files.

2. The multithreaded processing system of claim 1, further comprising means for performing parity error checking with respect to a register or memory location associated with an active thread.

3. The multithreaded processing system of claim 2, further comprising means for accessing the redundant data entry when the parity error checking means detects an error with respect to a register or memory location associated with an active thread.

4. The multithreaded processing system of claim 3, further comprising means for updating the multithreaded register file associated with the active thread based on the redundant data entry when the parity error checking means detects an error with respect to the register or memory location associated with the active thread.

5. The multithreaded processing system of claim 1, wherein the means for establishing a flag bit is adapted to configure the flag bits during runtime according to a free register list generated by a register renaming utility.

6. The multithreaded processing system of claim 1, further comprising: means for immediate write-back and self-recovery with respect to the redundant data entry.

7. The multithreaded processing system of claim 1, wherein the at least two multithreaded register files are associated with a single microprocessor.

8. The multithreaded processing system of claim 1, wherein the at least two multithreaded register files are associated with a plurality of microprocessors.

9. The multithreaded processing system of claim 1, wherein each of the at least two multithreaded register files are selected from the group consisting of dual-threaded register files, triple-threaded register files, quad-threaded register files, and n-way threaded register files.

* * * * *